United States Patent
Lee et al.

(10) Patent No.: US 8,670,593 B2
(45) Date of Patent: Mar. 11, 2014

(54) APPARATUS AND METHOD FOR DYNAMICALLY CONTROLLING INTEGRATION TIME OF DEPTH CAMERA FOR ACCURACY IMPROVEMENT

(75) Inventors: Seung Kyu Lee, Seoul (KR); Do Kyoon Kim, Seongnam-si (KR); Kee Chang Lee, Yongin-si (KR); Byong Min Kang, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 264 days.

(21) Appl. No.: 13/067,338

(22) Filed: May 25, 2011

(65) Prior Publication Data

US 2012/0106803 A1 May 3, 2012

(30) Foreign Application Priority Data

Nov. 3, 2010 (KR) ........................ 10-2010-0108511

(51) Int. Cl.
  *G06K 9/00* (2006.01)
(52) U.S. Cl.
  USPC ........................................ 382/107; 348/221.1
(58) Field of Classification Search
  USPC ............ 382/100, 103, 107, 260–265; 378/96; 348/208.12, 221.1, 229.1, 362, 296, 348/367, 295
  See application file for complete search history.

(56) References Cited

U.S. PATENT DOCUMENTS

| | | | | |
|---|---|---|---|---|
| 5,097,340 | A * | 3/1992 | Tanabe et al. | 348/371 |
| 5,198,856 | A * | 3/1993 | Odaka et al. | 396/54 |
| 5,299,015 | A * | 3/1994 | Imaide et al. | 348/229.1 |
| 5,414,486 | A * | 5/1995 | Goto et al. | 396/52 |
| 5,969,350 | A | 10/1999 | Kerley et al. | |
| 6,879,731 | B2 * | 4/2005 | Kang et al. | 382/274 |
| 7,454,131 | B2 * | 11/2008 | Suda | 396/55 |
| 7,580,058 | B2 * | 8/2009 | Ayaki et al. | 348/208.12 |
| 7,705,314 | B2 | 4/2010 | Cook et al. | |
| 8,031,775 | B2 * | 10/2011 | Luo et al. | 375/240.16 |
| 8,055,025 | B2 * | 11/2011 | Po et al. | 382/107 |
| 8,149,323 | B2 * | 4/2012 | Li et al. | 348/345 |

FOREIGN PATENT DOCUMENTS

| | | |
|---|---|---|
| JP | 2008-147894 | 6/2008 |
| JP | 2009-047497 | 3/2009 |
| JP | 2010-071976 | 4/2010 |
| KR | 10-2008-0051015 | 6/2008 |
| KR | 10-2009-0050567 | 5/2009 |
| KR | 10-2010-0072590 | 7/2010 |

* cited by examiner

*Primary Examiner* — Anand Bhatnagar
(74) *Attorney, Agent, or Firm* — Staas & Halsey LLP

(57) ABSTRACT

An integration time dynamic control apparatus and method for dynamically controlling an integration time of a depth camera based on a motion of a depth image, are provided to improve an accuracy of the depth image. The integration time dynamic control apparatus may measure a motion of a depth image acquired from the depth camera, may determine whether the measured motion is greater than or equal to a reference value set in advance, and may control the integration time of the depth camera based on a result of the determination, thereby improving the accuracy of the depth image.

20 Claims, 5 Drawing Sheets

APPARATUS AND METHOD FOR DYNAMICALLY CONTROLLING INTEGRATION TIME OF DEPTH CAMERA FOR ACCURACY IMPROVEMENT

CROSS-REFERENCE TO RELATED APPLICATIONS

This application claims the benefit of Korean Patent Application No. 10-2010-0108511, filed on Nov. 3, 2010, in the Korean Intellectual Property Office, the disclosure of which is incorporated herein by reference.

BACKGROUND

1. Field

Example embodiments of the following description relate to a method of acquiring a depth image with a high accuracy.

2. Description of the Related Art

An accuracy of a depth image acquired from a depth camera employing a Time-of-Flight (TOF) scheme varies depending on an internal factor such as a camera frequency and an integration time, as well as an external factor such as materials or colors of an object.

In particular, an accuracy of an acquired depth image increases, as an integration time becomes longer. However, a maximum value of an integration time when an image is captured in real-time may be limited by a desired frame rate.

SUMMARY

An apparatus for dynamically controlling an integration time of a depth camera, includes a motion measurement unit to measure a motion of a depth image, acquired from the depth camera, and an integration time controller to determine whether the measured motion is greater than or equal to a reference value set in advance, and to control an integration time of the depth camera based on a result of the determination.

When the measured motion is greater than or equal to the reference value, the integration time controller may adjust the integration time to be shorter than a previous integration time. When the measured motion is less than the reference value, the integration time controller may either maintain the integration time to be the same or adjust the integration time to be longer than the previous integration time.

The apparatus may further include a temporal filtering unit to filter an n-th depth image using a plurality of 'n–N' depth images by an exponential weighting scheme of applying a weighted value to an (n–N)th depth image filtered in advance from the n-th depth image. Here, the plurality of 'n–N' depth images may be temporally different from the n-th depth image, where N may denote a natural number, and n may denote a current frame.

The temporal filtering unit may recursively apply a predetermined 'weighted value' to an (n–1)-th depth image filtered using previous frames of an (n–1)th frame, and may filter the n-th depth image using the 'n–N depth images' so that a 'weighted value$^N$' may be applied to the (n–N)-th depth image.

The temporal filtering unit may adjust the weighted value based on the integration time, and may control a number of frames reflected on the n-th depth image.

The temporal filtering unit may adjust the weighted value to be greater than or equal to a previous weighted value when the integration time is adjusted to be shortened, or may adjust the weighted value to be less than the previous weighted value when the integration time is adjusted to be lengthened.

The motion measurement unit may measure the motion of the depth image using a motion flow of frames contained in the depth image or using a difference between the frames.

An apparatus for dynamically controlling an integration time of a depth camera, includes an integration time controller to determine whether a motion measured from a depth image is greater than or equal to a reference value set in advance, and to control an integration time of the depth camera based on a result of the determination.

The apparatus may further include a depth camera to generate a next depth image based on the controlled integration time.

A method of dynamically controlling an integration time of a depth camera, includes determining whether a motion measured from a depth image is greater than or equal to a reference value set in advance, and controlling an integration time of the depth camera based on a result of the determining.

Additional aspects, features, and/or advantages of example embodiments will be set forth in part in the description which follows and, in part, will be apparent from the description, or may be learned by practice of the disclosure.

According to example embodiments, it is possible to improve an accuracy of a depth image by dynamically adjusting an integration time of a depth camera based on a motion of the depth image.

Additionally, according to example embodiments, it is possible to implement temporal filtering with a small capacity memory, by filtering a current depth image by an exponential weighting scheme of applying a weighted value to a previous depth image filtered in advance.

Furthermore, according to example embodiments, it is possible to efficiently improve an accuracy of a depth image by interpolating the depth image lost due to an adjustment of an integration time, even when a constant frame rate needs to be maintained.

BRIEF DESCRIPTION OF THE DRAWINGS

These and/or other aspects and advantages will become apparent and more readily appreciated from the following description of the example embodiments, taken in conjunction with the accompanying drawings of which.

DETAILED DESCRIPTION

Figure 1:
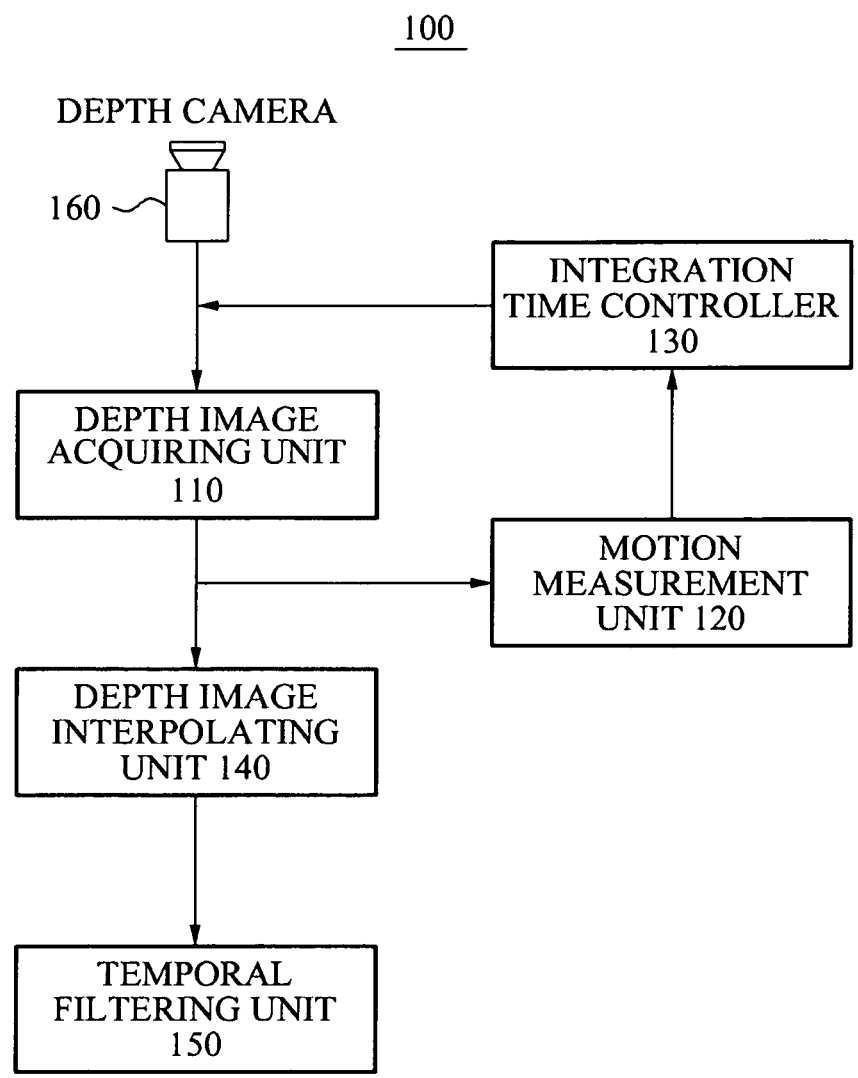
FIG. 1 is a block diagram of an integration time dynamic control apparatus for dynamically controlling an integration time of a depth camera according to example embodiments.

Reference will now be made in detail to example embodiments, examples of which are illustrated in the accompanying drawings, wherein like reference numerals refer to the like elements throughout. Example embodiments are described below to explain the present disclosure by referring to the figures.

FIG. 1 is a block diagram of an integration time dynamic control apparatus 100 for dynamically controlling an integration time of a depth camera according to example embodiments. Referring to FIG. 1, the integration time dynamic control apparatus 100 may include a depth image acquiring unit 110, a motion measurement unit 120, an integration time controller 130, a depth image interpolating unit 140, a temporal filtering unit 150, and a depth camera 160.

The depth camera 160 may employ a Time-of-Flight (TOF) scheme. The depth camera 160 may generate a depth image by capturing an object based on an integration time set in advance. During the integration time, electrons may be collected to generate a single frame included in a depth image. Accordingly, as the integration time becomes longer, an accuracy of the depth image generated by the depth camera 160 increases. Conventionally, since an integration time is associated with a frame rate, the integration time is set based on a frame rate. However, according to example embodiments, the depth camera 160 may dynamically adjust the integration time based on a motion of the generated depth image, to generate a new depth image.

The depth image acquiring unit 110 may acquire the depth image generated by the depth camera 160, and may provide the acquired depth image to the motion measurement unit 120 or the depth image interpolating unit 140. For example, the depth image acquiring unit 110 may transfer a first depth image to the motion measurement unit 120, and may control an integration time of a second depth image based on a motion of the first depth image. Here, the first depth image may be generated prior to generation of the second depth image.

The motion measurement unit 120 may measure a motion of the acquired depth image. For example, the motion measurement unit 120 may obtain a Sum of Squared Differences (SSD) for each pixel included in the depth image, and may measure the motion of the depth image. To measure the motion of the depth image, the motion measurement unit 120 may use, for example, a motion flow of frames included in the depth image, or a difference between the frames. Here, a conventional scheme of measuring a motion of a depth image may be used and accordingly, a further description thereof will be omitted.

The integration time controller 130 may determine whether the measured motion is greater than or equal to a reference value set in advance, and may control the integration time of the depth camera 160 based on a result of the determination. The reference value may be set as a numerical value used to determine that the integration time needs to be controlled depending on the amount of motion in a depth image through a test. The reference value may be interpreted as a 'threshold value'.

When the measured motion is greater than or equal to the reference value, the integration time controller 130 may adjust the integration time to be shorter than a previous integration time. Specifically, when the measured motion is greater than or equal to the reference value, the integration time controller 130 may determine a large amount of mention in the depth image, and may adjust the integration time to be shortened, so that an accuracy of a next depth image to be generated may be increased. For example, assuming that a first depth image is generated for '0.03 seconds (sec)' as an integration time, when a motion of the first depth image is greater than or equal to a reference value set in advance, the integration time controller 130 may adjust the integration time to be '0.016 sec' that is shorter than '0.03 sec'. In this example, the depth camera 160 may generate a second depth image based on the adjusted integration time, namely '0.016 sec'.

The previous integration time may be temporally different from the integration time, and may refer to, for example, an integration time prior to the integration time. The second depth image may be temporally different from the first depth image, and may be, for example, a depth image generated after the first depth image is generated.

Conversely, when the measured motion is less than the reference value, the integration time controller 130 may either maintain the integration time to be the same or adjust the integration time to be longer than the previous integration time. Specifically, when the measured motion is less than the reference value, the integration time controller 130 may determine a small amount of motion in the depth image, may predict that a small amount of motion is also measured in a next depth image to be generated, and may not adjust the integration time. Additionally, to increase an accuracy of the next depth image, the integration time controller 130 may adjust the integration time to be longer than the previous integration time. For example, assuming that a first depth image is generated for '0.03 sec' as an integration time, when a motion of the first depth image is less than a reference value set in advance, the integration time controller 130 may either maintain the integration time to be the same as '0.03 sec' or adjust the integration time to be '0.06 sec' that is longer than '0.03 sec'. In this example, the depth camera 160 may generate a second depth image based on the adjusted integration time, namely '0.06 sec'.

The depth image interpolating unit 140 may interpolate an intermediate depth image using the acquired depth image. The depth image interpolating unit 140 needs to acquire three depth images for a predetermined period of time. However, when only two depth images are acquired due to a long integration time, the depth image interpolating unit 140 may interpolate the intermediate depth image using the two depth images.

Figure 2:
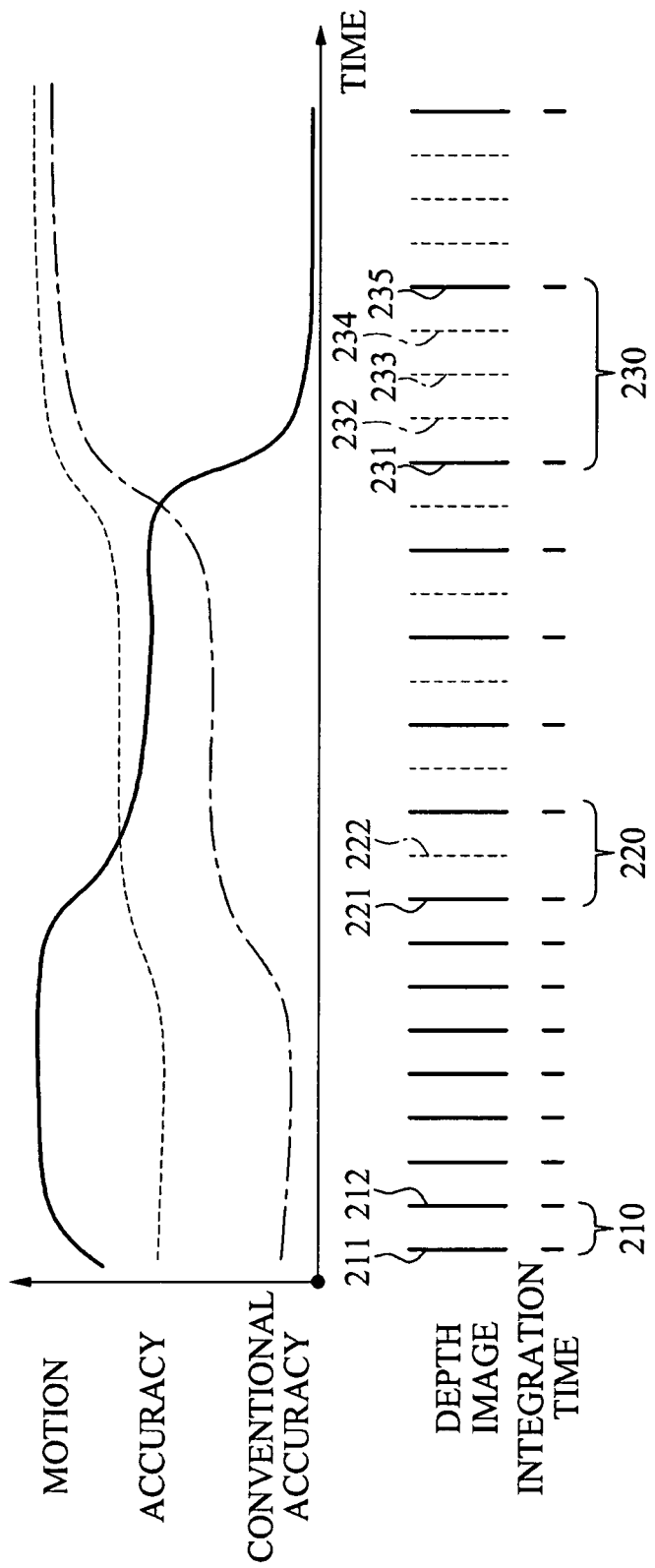
FIG. 2 is a diagram illustrating an example in which an accuracy of a depth image is improved based on a motion according to example embodiments.

FIG. 2 is a diagram illustrating an example in which an accuracy of a depth image is improved based on a motion according to example embodiments. In FIG. 2, a dotted line represents an accuracy according to example embodiments, and a dash-dotted line represents a conventional accuracy. FIG. 2 shows that the accuracy represented by the dash-dotted line is reduced, as the amount of motion of a depth image is increased. However, the accuracy represented by the dotted line is improved even when the amount of motion is increased, since an integration time is adjusted based on the amount of motion.

In an example, when a large amount of motion of a depth image is measured, the integration time dynamic control apparatus 100 may set a short integration time 210, and may acquire depth images 211 and 212 based on the short integration time 210.

In another example, when a small amount of motion of the depth image is measured, the integration time dynamic control apparatus 100 may set an integration time 220 to be longer than the integration time 210, and may acquire a depth image 221 based on the set integration time 220. In this example, the depth image interpolating unit 140 may interpolate an intermediate depth image 222 using the acquired depth image 221, so that an accuracy of the depth image may be improved.

In still another example, when a smaller amount of motion of the depth image is measured, the integration time dynamic control apparatus 100 may set an integration time 230 to be longer than the integration time 220, and may acquire depth images 231 and 235 based on the set integration time 230. In this example, the depth image interpolating unit 140 may also interpolate intermediate depth images 232, 233, and 234 using the acquired depth images 231 and 235, so that an accuracy of the depth image may be improved.

When a constant frame rate needs to be maintained, when the integration time is adjusted to be lengthened by the integration time controller 130, a loss of the depth image may occur relatively. Here, the depth image interpolating unit 140 may interpolate an 'intermediate depth image' between a first depth image and a second depth image using the first depth image and the second depth image. The first depth image and the second depth image may be acquired sequentially.

Figure 3:
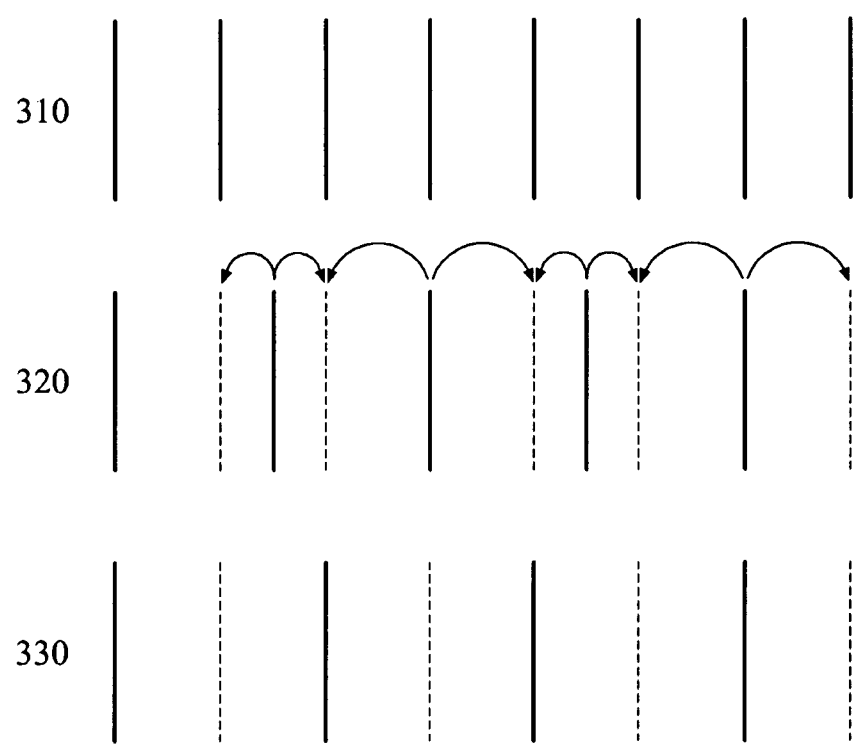
FIG. 3 is a diagram illustrating examples in which an integration time is adjusted based on a frame rate according to example embodiments.

FIG. 3 is a diagram of examples in which an integration time is adjusted based on a frame rate according to example embodiments. Referring to FIG. 3, reference numeral 310 indicates an example in which the integration time dynamic control apparatus 100 acquires depth images based on an integration time at a frame rate of '100 ms'. In this example, the depth image interpolating unit 140 may not need to interpolate an intermediate depth image between the depth images acquired while maintaining a constant frame rate.

Additionally, reference numeral 320 indicates an example in which the integration time dynamic control apparatus 100 acquires depth images based on an integration time at a frame rate of '150 ms'. When the frame rate is increased from '100 ms' to '150 ms', the integration time controller 130 may adjust the integration time to be longer than a previous integration time. In this example, the depth image interpolating unit 140 may interpolate required intermediate depth images denoted by dotted lines, using depth images that are denoted by solid lines and that are acquired based on the adjusted integration time. Here, there is no need to increase the integration time to multiples of a minimum value.

Furthermore, reference numeral 330 indicates an example in which the integration time dynamic control apparatus 100 acquires depth images based on an integration time at a frame rate of '200 ms'. When the frame rate is increased from '150 ms' to '200 ms', the integration time controller 130 may adjust the integration time to be longer than a previous integration time. In this example, the depth image interpolating unit 140 may interpolate required intermediate depth images denoted by dotted lines, using depth images that are denoted by solid lines and that are acquired based on the adjusted integration time. In other words, the integration time dynamic control apparatus 100 may continue to adjust the integration time based on the frame rate.

A conventional three-dimensional (3D) temporal filtering scheme based on motion compensation may require a memory to store a previous depth image. As a size of the memory is increased, that is, as a number of previous depth images in the memory are increased, an accuracy improvement effect of a depth image may be further improved. However, a memory capacity may be important in an actual implementation.

Example embodiments may propose a method of efficiently performing a motion compensation using a small capacity memory.

The temporal filtering unit 150 may filter the depth image, and may store the filtered depth image in a memory. The temporal filtering unit 150 may filter a current depth image, namely a second depth image, using only a previous depth image, namely a first depth image that is prior to the current depth image. When the second depth image is filtered, the temporal filtering unit 150 may filter a next depth image, namely a third depth image, using the second depth image.

Specifically, the temporal filtering unit 150 may filter an n-th depth image using a plurality of 'n–N' depth images by an exponential weighting scheme of applying a weighted value to an (n–N)th depth image filtered in advance. Here, the plurality of 'n–N' depth images may be temporally different from the n-th depth image. Additionally, N may denote a natural number, and n may denote a current frame. For example, conventionally, a same weighted value may be applied to N previous depth images. However, to perform 3D temporal filtering without using an additional memory, the temporal filtering unit 150 may employ an 'exponential weighting scheme' that enables a previous depth image farther apart from a current depth image to have a lower weighted value.

$$I\_f(n)=I(n)+a*I(n-1), 0<a<1 \quad \text{[Equation 1]}$$

In Equation 1, 'a' denotes a weighed value, 'I(n–1)' denotes a depth image acquired at a viewpoint 'n–1', 'I(n)' denotes a depth image acquired at a viewpoint 'n', and 'I_f (n)' denotes a result of filtering the depth image acquired at the viewpoint 'n'. The weighted value may be set as a number between 0 and 1. Additionally, the depth image at the viewpoint 'n–1' may be temporally prior to the depth image at the viewpoint 'n'.

Specifically, 'I(n)' may indicate the current depth image, namely the second depth image, at the viewpoint 'n', and 'I(n–1)' may indicate the previous depth image, namely the first depth image. The temporal filtering unit 150 may combine the second depth image 'I(n)' with the first depth image 'I(n–1)' to which the weighted value 'a' is applied, and may filter the second depth image 'I(n)', to obtain 'I_f(n)'. The temporal filtering unit 150 may filter a depth image by the 'exponential weighting scheme' that is recursively applied for each depth image.

$$I\_f(n)=I(n)+a*I\_f(n-1)=I(n)+a*I(n-1)+a^2*I(n-2) \quad \text{[Equation 2]}$$

In Equation 2, 'I(n–2)', 'I(n–1)', and 'I(n)' denote depth images acquired in sequence of time. Specifically, 'I(n–1)' denotes a depth image acquired at a viewpoint 'n–1', and 'I(n–2)' denotes a depth image acquired at a viewpoint 'n–2'. Additionally, 'I_f(n–1)' denotes a result of filtering the depth image at the viewpoint 'n–1'.

Referring to Equation 2, when 'I_f(n–1)' is obtained by filtering the depth image of the viewpoint 'n–1' from a previous frame, the images 'I(n–1)' and 'I(n–2)' may be repeatedly expressed.

As a result, the temporal filtering unit 150 may apply a weighted value $a^N$ to a depth image that is spaced apart by N from a current depth image, and may filter the current depth image. Accordingly, a motion compensation may be performed whenever each depth image is filtered and thus, a motion compensation for each depth image may also be additively reflected.

The temporal filtering unit 150 may adjust the weighted value based on the integration time, and may control a number of frames reflected on the n-th depth image. The temporal filtering unit 150 may perform filtering using only a frame of a current time and a frame of a previous time that are stored in the depth image interpolating unit 140 and thus, it is possible to use a small capacity memory.

Figure 4:
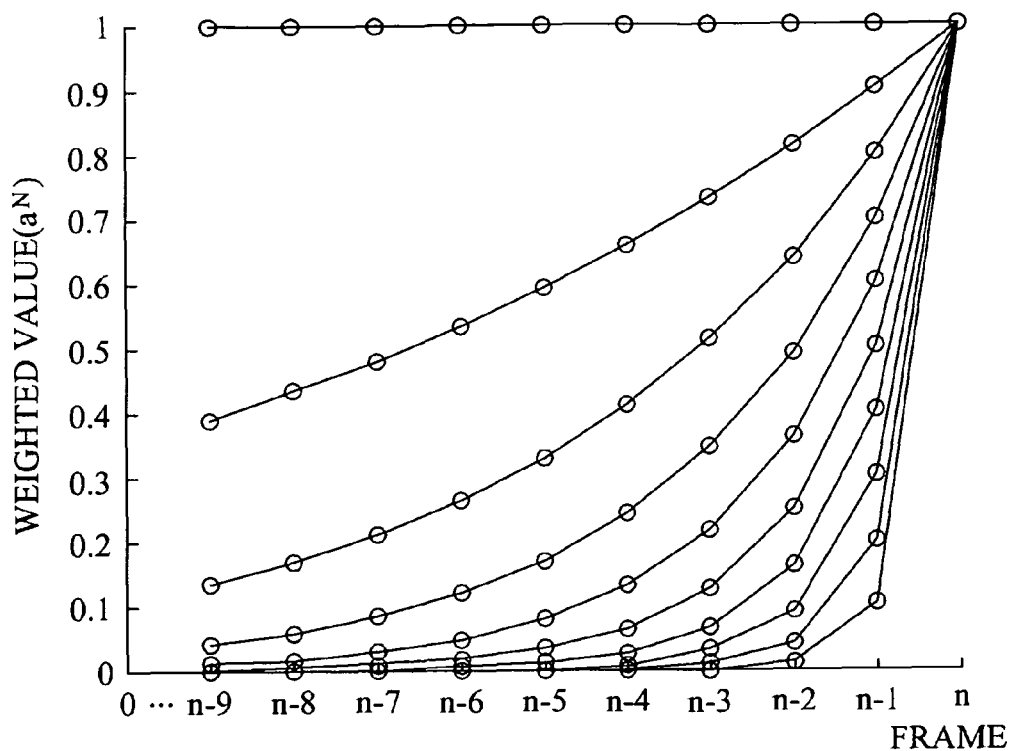
FIG. 4 is a graph illustrating a diagram of an example in which a number of frames are adjusted by adjusting a weighted value according to example embodiments.

FIG. 4 is a graph illustrating an example in which a number of frames are adjusted by adjusting a weighted value according to example embodiments. Referring to FIG. 4, the temporal filtering unit 150 may adjust a weighted value a based on an integration time, and may control a number of frames in an n-th depth image. In an example, when the integration time is adjusted to be shortened, the temporal filtering unit 150 may predict that a large number of motions are measured in a depth image to be filtered, and may adjust the weighted value to be smaller. In this example, the temporal filtering unit 150 may filter a current depth image using a small number of frames in a previous depth image, to improve an accuracy of the current depth image.

In another example, when the integration time is adjusted to be lengthened, the temporal filtering unit 150 may predict that a small number of motions are measured in a depth image to be filtered, and may adjust the weighted value to be larger. In this example, the temporal filtering unit 150 may filter a current depth image using a large number of frames in a previous depth image, to improve an accuracy of the current depth image.

Figure 5:
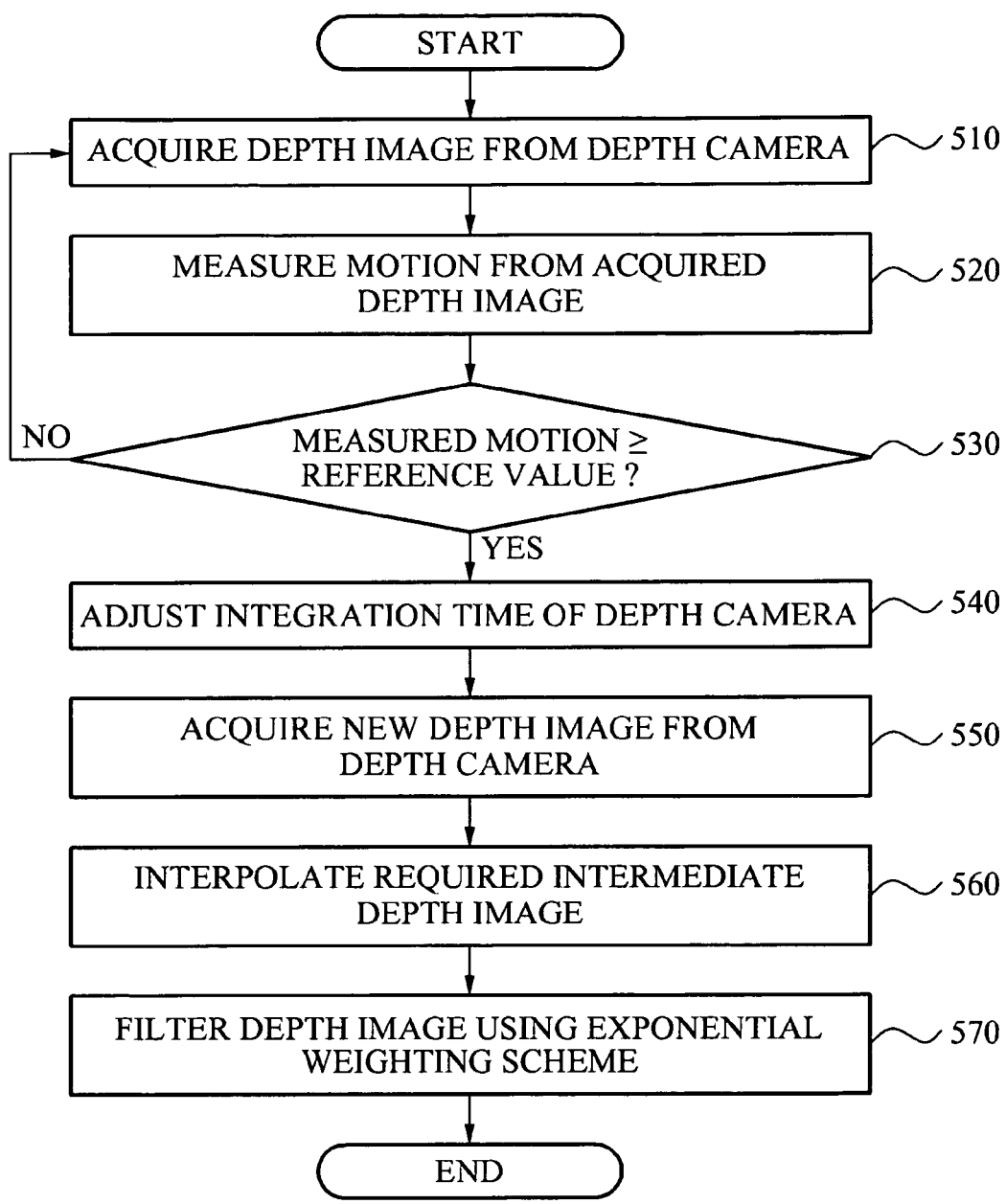
FIG. 5 is a flowchart of a method of dynamically controlling an integration time of a depth camera according to example embodiments.

FIG. 5 is a flowchart of a method of dynamically controlling an integration time of a depth camera according to example embodiments. Referring to FIG. 5, in operation 510, the integration time dynamic control apparatus 100 of FIG. 1 may acquire a depth image through the depth camera 160 based on an integration time. The depth camera 160 may generate a depth image by capturing an object based on an integration time set in advance. During the integration time, electrons may be collected to generate a single frame included in a depth image. The depth camera 160 may dynamically adjust the integration time based on a motion of the generated depth image, to generate a new depth image.

In operation 520, the integration time dynamic control apparatus 100 may measure a motion from the acquired depth image. The motion of the depth image may be measured using a motion flow of frames included in the depth image, or using a difference between the frames.

In operation 530, the integration time dynamic control apparatus 100 may determine whether the measured motion is greater than or equal to a reference value set in advance. The reference value may be set as a numerical value used to determine that the integration time needs to be controlled depending on a number of motions in a depth image through a test. The reference value may be interpreted as a 'threshold value'. For example, when the motion is less than the reference value, the integration time dynamic control apparatus 100 may either perform operation 510 without adjusting the integration time, or adjust the integration time to be longer than a previous integration time, so that a new depth image may be generated by the depth camera 160. Conversely, when the motion is greater than or equal to the reference value, the integration time dynamic control apparatus 100 may perform operation 540.

In operation 540, the integration time dynamic control apparatus 100 may adjust the integration time of the depth camera 160. When the measured motion is greater than or equal to the reference value, the integration time dynamic control apparatus 100 may adjust the integration time to be shorter than the previous integration time. Specifically, when the measured motion is greater than or equal to the reference value, the integration time dynamic control apparatus 100 may determine a large number of motions in the depth image, and may adjust the integration time to be shortened, to improve an accuracy of a next depth image to be generated.

In operation 550, the integration time dynamic control apparatus 100 may acquire a new depth image through the depth camera 160 based on the adjusted integration time. For example, when the depth image generated in operation 510 is defined as a 'first depth image', the new depth image generated in operation 550 may be interpreted as a 'second depth image'. In other words, the second depth image may be temporally different from the first depth image, and may be generated after the first depth image is generated.

In operation 560, the integration time dynamic control apparatus 100 may interpolate a required intermediate depth image using the acquired depth image. Operation 560 may be performed only when the intermediate depth image is required for the acquired depth image. For example, when a depth image acquired based on the integration time has a high accuracy, the integration time dynamic control apparatus 100 may perform operation 570 while skipping operation 560.

In operation 570, the integration time dynamic control apparatus 100 may filter the depth image using an exponential weighting scheme. For example, the integration time dynamic control apparatus 100 may recursively apply a predetermined 'weighted value' to the (n−1)-th depth image filtered in advance, to obtain an effect as if a 'weighted value$^N$' is applied to the (n−N)-th depth image, so that the n-th depth image may be filtered using the 'n−N depth images'.

The method of FIG. 5 may be performed by the integration time dynamic control apparatus 100 of FIG. 1. The integration time dynamic control apparatus 100 has been described in detail with reference to FIG. 1 and accordingly, further description thereof will be omitted.

The method according to the above-described example embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa. In addition, a non-transitory computer-readable storage medium may be distributed among computer systems connected through a network and non-transitory computer-readable codes or program instructions may be stored and executed in a decentralized manner.

Although example embodiments have been shown and described, it would be appreciated by those skilled in the art that changes may be made in these example embodiments without departing from the principles and spirit of the disclosure, the scope of which is defined in the claims and their equivalents.

What is claimed is:
1. An apparatus for dynamically controlling an integration time of a depth camera, comprising:
   a motion measurement unit to measure a motion of a depth image acquired from the depth camera;
   an integration time controller to determine whether the measured motion is greater than or equal to a reference value set in advance, and to control an integration time of the depth camera based on a result of the determination; and
   a temporal filtering unit to filter a current depth image by applying a weighted cvalue to previous depth images.

2. The apparatus of claim 1, wherein:
when the measured motion is greater than or equal to the reference value, the integration time controller adjusts the integration time to be shorter than a previous integration time, and
when the measured motion is less than the reference value, the integration time controller either maintains the integration time to be the same or adjusts the integration time to be longer than the previous integration time.

3. The apparatus of claim 1,
wherein (n-N)th depth images corresponding to the previous depth images are temporally different t from n-th depth image corresponding to the current depth image, where N denotes a natural number, and n denotes a current frame.

4. The apparatus of claim 3, wherein the temporal filtering unit recursively applies a predetermined 'weighted value' to an (n−1)th depth image filtered using previous frames of an (n−1)th frame, and filters the n-th depth image using (n−N)th depth images so that a 'weighted value$^N$' is applied to the (n−N)th depth image.

5. The apparatus of claim 3, wherein the temporal filtering unit adjusts the weighted value based on the integration time, and controls a number of frames reflected on the n-th depth image.

6. The apparatus of claim 5, wherein the temporal filtering unit adjusts the weighted value to be greater than or equal to a previous weighted value when the integration time is adjusted to be shortened, or adjusts the weighted value to be less than the previous weighted value when the integration time is adjusted to be lengthened.

7. The apparatus of claim 1, wherein the motion measurement unit measures the motion of the depth image using a motion flow of frames contained in the depth image or using a difference between the frames.

8. An apparatus for dynamically controlling an integration time of a depth camera, comprising:
an integration time controller to determine whether a motion measured from a depth image is greater than or equal to a reference value set in advance, and to control an integration time of the depth camera based on a result of the determination, and
a temporal filtering unit to filter a current depth image by applying a weighed value to previous depth images.

9. The apparatus of claim 8, further comprising:
a depth camera to generate a next depth image based on the controlled integration time.

10. The apparatus of claim 8,
wherein (n−N)th depth images corresponding to the previous depth images are temporally different from n-th depth image corresponding to the current image, where N denotes a natural number, and n denotes a current frame.

11. A method of dynamically controlling an integration time of a depth camera, comprising:
determining whether a motion measured from a depth image is greater than or equal to a reference value set in advance;
controlling an integration time of the depth camera based on a result of the determining; and
filtering a current depth image by applying a weighted value to previous depth images.

12. The method of claim 11, wherein the controlling comprises adjusting the integration time to be shorter than a previous integration time when the measured motion is greater than or equal to the reference value.

13. The method of claim 11, wherein the controlling comprises either maintaining the integration time to be the same as, or adjusting the integration time to be longer than, the previous integration time, when the measured motion is less than the reference value.

14. The method of claim 11,
wherein (n−N)th depth images corresponding to the previous depth images are temporally different from n-th depth image corresponding to the current depth image, where N denotes a natural number, and n denotes a current frame.

15. The method of claim 14, wherein the filtering comprises filtering the n-th depth image by applying a 'weighted value$^N$' to the (n−N)th depth images.

16. The method of claim 14, further comprising adjusting the weighted value based on the integration time, and controlling a number of frames reflected on the n-th depth image.

17. The method of claim 16, wherein the adjusting comprises adjusting the weighted value to be greater than or equal to a previous weighted value when the integration time is adjusted to be shortened, or adjusting the weighted value to be less than the previous weighted value when the integration time is adjusted to be lengthened.

18. A method of controlling an integration time of a depth camera, comprising:
measuring a motion of a depth image;
dynamically adjusting an integration time of the depth camera based on the measured motion and temporally filtering a current depth image by applying a weighted value to previous depth images.

19. The method according to claim 18 wherein the measuring comprises determining whether a motion measured from the depth image is greater than or equal to a reference value set in advance.

20. The method of claim 18, further comprising interpolating a depth image lost due to the adjustment of the integration time.

* * * * *